(12) United States Patent
Goyal et al.

(10) Patent No.: US 12,242,365 B2
(45) Date of Patent: Mar. 4, 2025

(54) APPLICATION UPTIME CALCULATION IN HOSTED ENVIRONMENT

(71) Applicant: SAP SE, Walldorf (DE)

(72) Inventors: Saurabh Goyal, Bangalore (IN); Shefali Srivastava, Delhi (IN); Bert Schulze, Pfinztal (DE); Manish Saraswat, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/347,341

(22) Filed: Jul. 5, 2023

(65) Prior Publication Data

US 2025/0036539 A1    Jan. 30, 2025

(51) Int. Cl.
*G06F 11/34*   (2006.01)
*G06F 11/00*   (2006.01)

(52) U.S. Cl.
CPC ........ *G06F 11/3419* (2013.01); *G06F 11/008* (2013.01)

(58) Field of Classification Search
CPC ............................ G06F 11/3419; G06F 11/008
See application file for complete search history.

(56) References Cited

U.S. PATENT DOCUMENTS

| 11,983,094 B2 * | 5/2024 | Downie | G06F 11/0778 |
| 2005/0251792 A1* | 11/2005 | Smith | G06F 11/3438 |
| | | | 717/131 |

* cited by examiner

*Primary Examiner* — Nadeem Iqbal
(74) *Attorney, Agent, or Firm* — Mintz Levin Cohn Ferris Glovsky and Popeo, P.C.

(57) ABSTRACT

In some implementations, there is provided a method that includes monitoring, by an application uptime system, whether execution of an application is successful without causing an incident; in response to the execution of the application being unsuccessful and causing the incident, the method further comprising: collecting one or more end user incident reports including an incident identifier, a start time of the incident, and a stop time of the incident, collecting one or more development system incident reports linked to the one or more end user incident reports, determining at least one end user metric for the application, generating one or more user interface views based on the at least one end user metric for the application, and causing to be presented the one or more user interface views. Related systems, methods, and articles of manufacture are also disclosed.

20 Claims, 8 Drawing Sheets

| Customer | Incident ID | Incident Created on | Incident last updated / resolved on | Business Disruption Days | Total Business Disruption Days | Total time for which software is not available | Aggregate Business Disruption Days | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 | 01-Jan-23 |
|---|---|---|---|---|---|---|---|---|---|---|---|---|---|---|---|---|---|---|---|---|---|---|---|---|---|
| Cust1 | Inc-0001 | 01-Jan-23 | 10-Jan-23 | 10 | 23 | 16 | 40 | | | | | | | | | | | | | | | | | | | |
| Cust1 | Inc-0002 | 02-Jan-23 | 05-Jan-23 | 4 | | | | | | | | | | | | | | | | | | | | | | |
| Cust1 | Inc-0003 | 08-Jan-23 | 12-Jan-23 | 5 | | | | | | | | | | | | | | | | | | | | | | |
| Cust1 | Inc-0004 | 15-Jan-23 | 18-Jan-23 | 4 | | | | | | | | | | | | | | | | | | | | | | |
| Cust2 | Inc-0005 | 05-Jan-23 | 10-Jan-23 | 6 | 17 | 13 | | | | | | | | | | | | | | | | | | | | |
| Cust2 | Inc-0006 | 02-Jan-23 | 05-Jan-23 | 4 | | | | | | | | | | | | | | | | | | | | | | |
| Cust2 | Inc-0007 | 08-Jan-23 | 12-Jan-23 | 5 | | | | | | | | | | | | | | | | | | | | | | |
| Cust2 | Inc-0008 | 15-Jan-23 | 16-Jan-23 | 2 | | | | | | | | | | | | | | | | | | | | | | |

FIG. 4

APPLICATION UPTIME CALCULATION IN HOSTED ENVIRONMENT

BACKGROUND

Applications including database management systems have become an integral part of many computer systems. For example, some systems handle hundreds if not thousands of transactions per second (which in-turn can generate over time a large volume of corresponding data). On the other hand, some systems perform very complex multidimensional analysis on data. In both cases, the underlying systems may need to handle responses to queries very quickly in order to satisfy systems requirements with respect to transaction time. Given the complexity of these queries and/or their volume, the underlying applications including databases face challenges in order to optimize performance including use of resources, such as memory and storage. Moreover, applications including database instances may be deployed on a cloud-based provider, which further creates issues with respect to the deployment, operation, and reliability of the application including the database.

SUMMARY

In some implementations, there is provided a method that includes monitoring, by an application uptime system, whether execution of an application is successful without causing an incident; in response to the execution of the application being successful without causing the incident, stopping, by the application uptime system, monitoring of the application until an external trigger is received; and in response to the execution of the application being unsuccessful and causing the incident, the method further comprising: collecting, by the application uptime system, one or more end user incident reports including an incident identifier, a start time of the incident, and a stop time of the incident, collecting, by the application uptime system, one or more development system incident reports linked to the one or more end user incident reports, determining, by the application uptime system, at least one end user metric for the application, generating, by the application uptime system, one or more user interface views based on the at least one end user metric for the application, and causing to be presented the one or more user interface views.

In some variations, one or more of the features disclosed herein including the following features can optionally be included in any feasible combination. The application uptime system may receive a first external trigger that is indicative of a change to the application hosted on a cloud platform, wherein the change comprises a new software version for the application, a patch for the application, and/or a fix for the application. The monitoring may be in response to the first external trigger being received by the application uptime system. A successful execution of the application may be based in part on whether an incident is reported for the application. When the application does not cause the incident, the execution of the application may be considered successful. When the application does cause the incident, the execution of the application may be considered unsuccessful. The end user incident reports may be collected from a data warehouse coupled to the application uptime system. The end user incident reports may be collected using a query based on at least one incident identifier for at least one incident. The development system incident reports may be linked to the end user incident reports via the at least one incident identifier. The application uptime system may determine the at least one end user metric comprising availability for the application based at least in part on a time associated with the incident being reported to the incident being resolved.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In the case of software as a service (SaaS), a provider of for example an application or a set of applications (also referred to as a "solution" or "solutions") may depend on the provider's ability to provide the application reliably. For example, a database management system hosted on a cloud-based platform (e.g., one or more servers coupled to and accessible via the Internet) should be available when needed by the end user. If the application is not available due to downtime (e.g., the application is not accessible, not operative, and/or otherwise not able to be used by the end user), the disruption caused by the downtime leads to a poor end user experience. One way to quantify the availability and reliability of an application can be via the availability of the host of the application. For example, a cloud provider's host machines may be monitored to determine availability, which may be used as a rough metric for the availability of the application being hosted on the cloud provider's machine(s), so when the cloud provider has an outage on the host machine (e.g., a computer) hosting the application (e.g., due to an outage, etc.), the application may be considered unavailable as well. Although the cloud provider's availability can serve as a rough metric for the availability of the application, it offers very little insight into the true availability of the application itself and, as such, offers little information to application developers seeking to correct issues with the application. Taking into account the availability of the application for an end user of the application may improve the actual uptime of the application and lead to enhanced information for developers (which may improve the development of the application and resolution of errors (also referred to as issues) associated with the application).

The availability (also referred to as uptime) of a system, such as a cloud platform hosting one or more applications, may be defined as an amount of time the system is available divided by total amount of time being measured. For example, if a system is available 364 days (with 1 day of downtime) over a 365-day period, the availability of the system in this simple example is 99.7%. In the case of a cloud provider hosting an application, this availability may be specified using a service level agreement (SLA). But as noted, the SLA covers a generally accepted view of the expectation from a cloud service provider for example, but does not take into account the end-to-end user experience with the application. For example, the cloud service provider may provide a platform (e.g., a host also referred to as a host machine) that may be available and running but an application hosted on the platform and being accessed by the end user might not be available due to for example an error caused by a recent revision to the application, an upgrade to the application, a patch to the application, and/or other reasons. Indeed, it can be comment to encounter downtime as a result of revision, patch, and/or upgrade. While a developer of the application works to resolve the issue with the application, the application is not available to the end user (even though the cloud platform is up and available), so the end user experience with the application is reduced.

In some implementations, there is provided a way to monitor and measure aspects of the application's uptime, such that the uptime takes into account the availability of the application itself (e.g., the actual time for which an application is available and usable from the perspective of an end user). Alternatively, or additionally, the infrastructure's availability (e.g., availability of the cloud provider hosting the application) may also be taken into account.

If an end user is accessing an application to create a purchase order via an application for example, the application should seamlessly and easily create the purchase order from the perspective of the end user. If the purchase order creation is hampered due to the application itself (e.g., an issue at the application caused by for example an upgrade, patch, or other type of change to the application) or the cloud provider infrastructure (which host's the application) not being available, this represents downtime (i.e., unavailability) that reduces the overall availability (i.e., uptime) of the application.

In some implementations, there are provided one or more ways of monitoring, collecting, and/or measuring the availability of the application. In this way, in addition to the infrastructure availability (e.g., availability of the cloud provider hosting the application), the application's availability may be monitored, collected, and/or measured. In the case of the application's availability, the application's availability may take into account a calculation of disruption (e.g., end user disruption) due to the application's unavailability (also referred to downtime) or availability (also referred to as uptime).

Figure 1A:
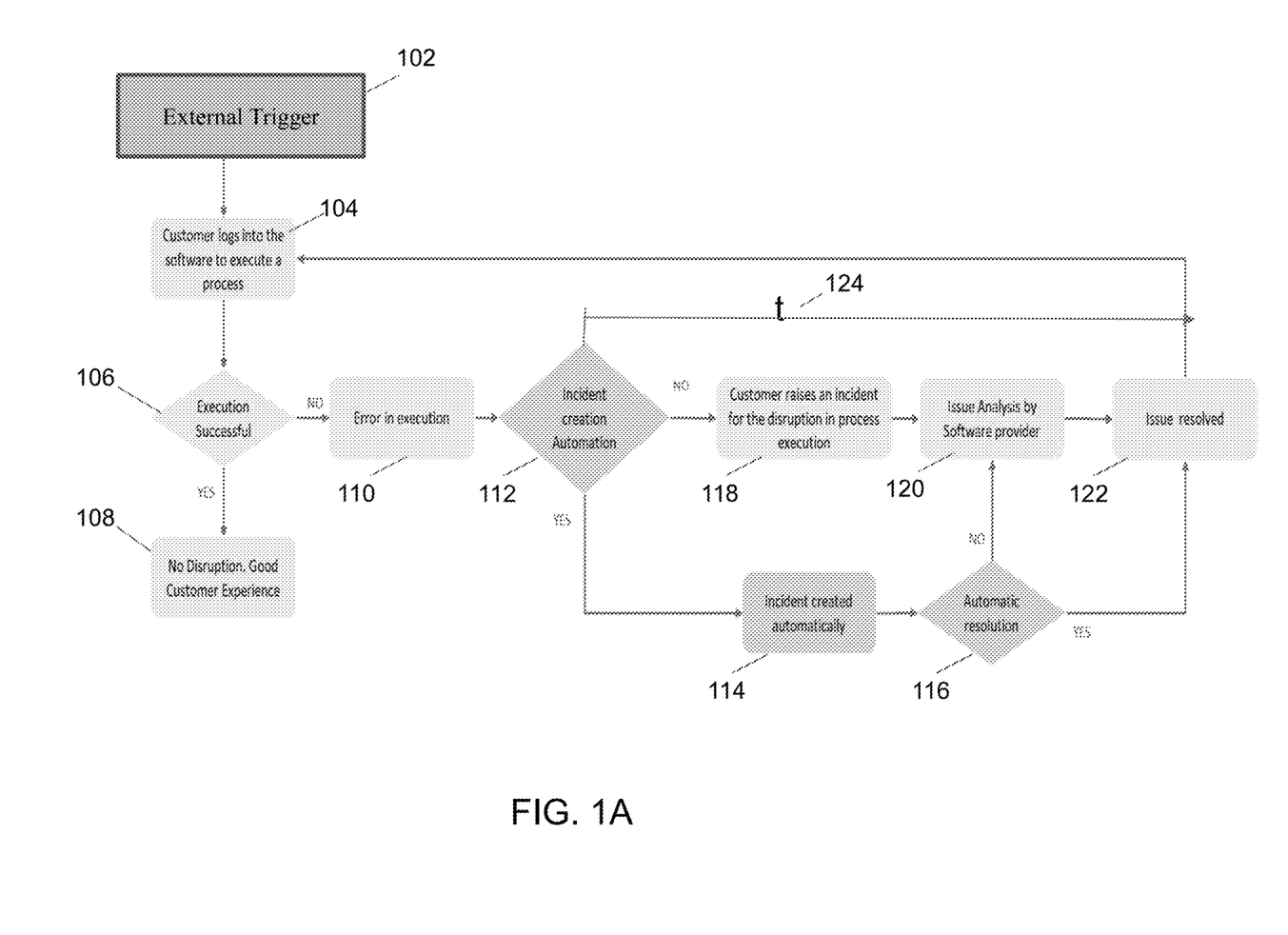
FIG. 1A depicts an example of a disruption causing downtime to an end user accessing an application, in accordance with some implementations.

FIG. 1A depicts an example of a process related to a disruption causing downtime to an end user accessing an application. In the example of FIG. 1A, an event, such as a software upgrade, patch, or some other type of fix or change to the application, may be an external trigger, at 102, that might cause the application to be unavailable. As such, the end user cannot use the application for its intended purpose. The software of the application may include modules, sub-modules, configuration data, and/or the like including thousands of lines of code interacting with each other to provide the process(es) of the application. Despite rigorous testing however, there may be conditions that might cause at the application a failure (also referred to as an issue, a fault, an incident, or an error). The failure may be under different degrees of severity (e.g., from a minor failure that allows limited use of the processes of the application to a more sever failure that does not allow the application to be used for its intended purpose). And, as noted, the failure may be triggered at 102 by for example an external event, such as updates, upgrades, fixes to the application, integration with another application, new feature(s) installed on the application, and/or the like.

At 104, the end user (e.g., customer) accesses (e.g., logs in, starts to use, uses, etc.) the application to execute a process, such as create a purchase order, perform a query of a database, and/or other type of operation. In this example, if the execution of the application is successful and the end user is able to create for example the purchase order using the application, there is no disruption to the end user accessing the application (yes at 106 and 108). In other words, the application is available.

But if there is an error in the execution of the application (e.g., the end user is unable to create the purchase order), the execution is not successful and as such disruptive to the end user (no at 106 and 110). In other words, the application is not available and there is an execution error 110 even though the underlying cloud service provider's host executing the application is available. Moreover, the error may be from the perspective of the end user, so the error may be any issue that hampers the end user's ability to fully utilize the application.

In some implementations, when there is an error in the execution at 110 of the application, an incident may be automatically created (yes at 112) using an automated incident creation and resolution system that creates an incident at 114 (e.g., a report or description of the execution error). For example, the automated incident creation and resolution system may include a machine learning model that detects the error in execution at 110 and creates an incident (e.g., a report describing the error in execution of the application). Alternatively, or additionally, the incident creation and resolution system may include a chat bot that displays the incident before the incident is reported. For example, the chat bot may present a user interface to the end user to further collect information from the end user regarding the error. In some cases, the automated incident creation and resolution system's machine learning model is able to resolve (yes at 116) the execution error (also referred to as an "issue"). For example, the automated incident creation and resolution system's machine learning model may learn from prior execution errors of the application to detect the execution error and provide a resolution to the error (e.g., a chat bot may guide the user through the resolution, provide an update to the application software to resolve the execution error, and/or provide some other type of fix or resolution).

Referring again to 112 at FIG. 1A, if the error in the execution of the application is not handled by the automated incident creation and resolution system, the end user may manually create an incident to document the error (no at 112 and 118). For example, the incident may include a description of the error, an identifier for the error (e.g., unique identifier), an identity of the end user, an identity of the application, a version of the software of the application, a time of day, a date, and/or other information about the application, the error, and/or the system hosting the application. At 120, the error may be provided to and/or resolved, at 122, by a software provider (e.g., a developer, a resolver, and/or a maintainer of the application's software). At 122 for example, the software provider may provide to the application having the execution error (or the end user of the application) a resolution to the error in the form of an update to the application software (e.g., a new version, a patch, and/or other type of change), instructions for a fix, and/or the like.

FIG. 1A shows that from the perspective of the end user of the application, there is a disruption to the use of the application causing thus downtime (unavailability) of the application over at least time t 124 (e.g., from creation of the incident report at 112 to the issue resolution at 122, although time t for the disruption may be measured over other time periods, such as starting at error execution 110 as well). FIG. 1A also shows that even though the cloud provider's infrastructure can be available, from the end user perspective there is a disruption to the application. And, the disruption t may be aggregated across a plurality of applications being used by the end user (or end users), aggregated across a plurality end users of the application(s), and/or may be used to provide a metric with respect to disruption (i.e., downtime). To illustrate further, the application may be a report generator application which is used by other applications and a variety of end users, so in this example, the disruption is aggregated across applications and end users.

Before providing additional description regarding end user focused availability of an application in a cloud-based environment, the following provides an example of a system environment.

Figure 1B:
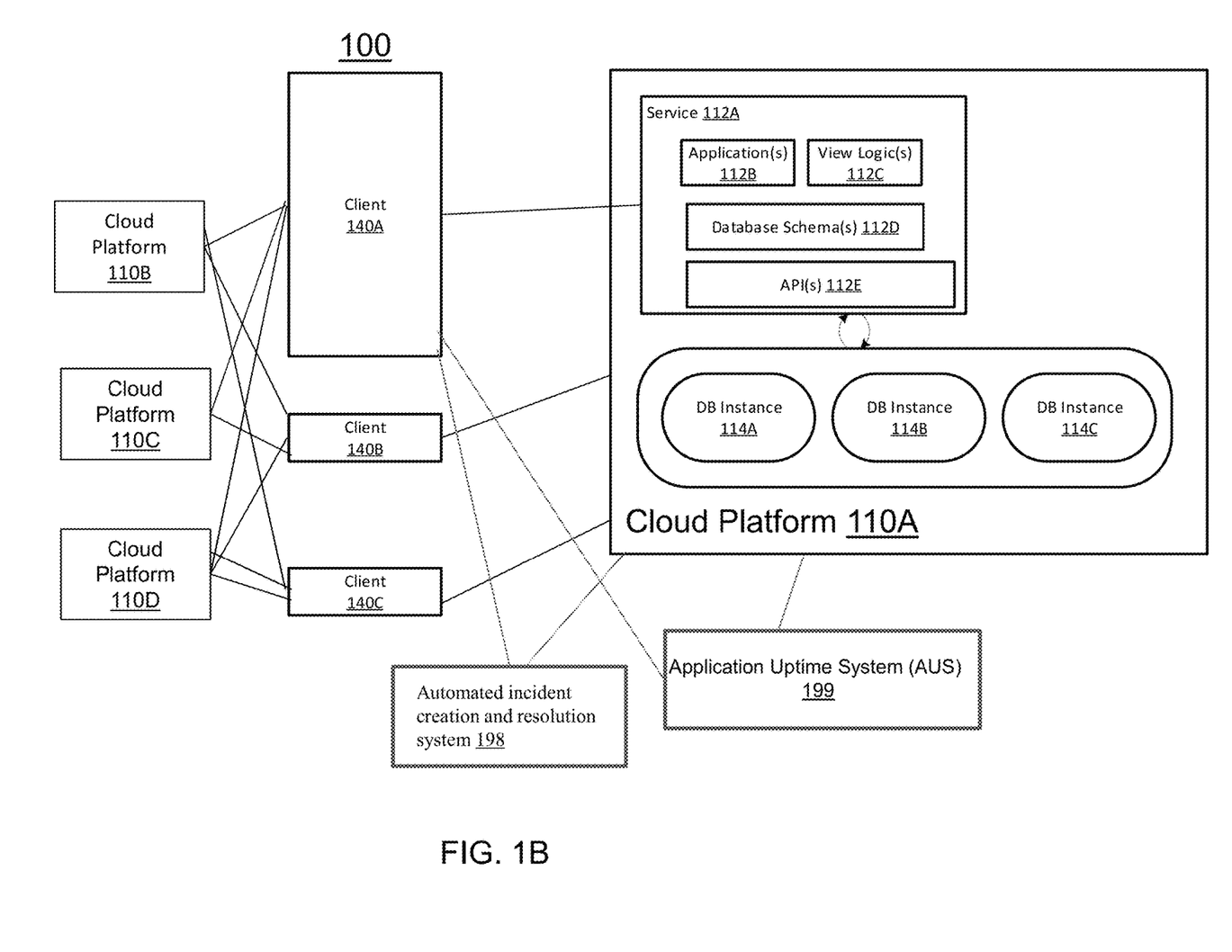
FIG. 1B depicts a diagram illustrating an example of a system, in accordance with some implementations.

FIG. 1B depicts a diagram illustrating an example of a system 100 consistent with some implementations of the current subject matter. Referring to FIG. 1B, the system 100 may include a plurality of cloud platforms 110A-D. Each of the cloud platforms may provide resources that can be shared among a plurality of tenants. For example, the cloud platforms 110A-D may be configured to provide a variety of services including, for example, software-as-a-service (SaaS), platform-as-a-service (PaaS), infrastructure as a service (IaaS), database as a service (DaaS), and/or the like, and these services can be accessed by one or more tenants (labeled "clients") of the cloud platform.

The system 100 may also include an application uptime system 199 (which couples to a client, such as the client 140A (e.g., a computer where the end user accesses the service or application)), a cloud service (e., cloud platform 110A), and/or a service (e.g., service 112A) hosting the application being monitored for availability. The application uptime system 199 may monitor the service 112A and/or the application 112B being monitored for availability. For example, the application uptime system 199 may monitor among other things incidents (e.g., incident reports) reporting errors in the execution of the application for example including the time of the downtime (e.g., time t 124). Alternatively, or additionally, the application uptime system 199 may interface with a cloud service provider to monitor any downtime associated with the host machines of the cloud service provider.

The system 100 may also include an automated incident creation and resolution system 198, which may also couple to a client, such as the client 140A, a cloud service (e.g., cloud platform 110A), and/or a service (e.g., service 112A), and/or the application 112B being monitored for availability. Alternatively, or additionally, the incident creation and/or resolution may also be reported, created, and/or resolved manually by one or more users via one or more user interfaces.

In the example of FIG. 1B, the system 100 includes a first tenant such as client 140A, a second tenant such as client 140B, and a third tenant such as client 140C, although other quantities of tenants (which as noted are labeled as tenants) may be implemented as well on the cloud platform 110A. A user (e.g., an end user) may access the client, and the clients may each comprise a user device (e.g., a computer including an application such as a browser or other type of application). And, the clients may each access, via the Internet and/or other type of network or communication link(s), at least one of the services at a cloud platform, such as cloud platform 110A-D. In some implementations, each of the tenants (which are labeled as clients) 140A-C represents a separate tenant at the cloud platform 110A for example, such that a tenant's data is not shared with other tenants (absent permission from a tenant). Alternatively, each of the tenants such as clients 140A-C may represent a single tenant at the cloud platform 110A, such that the tenants do share a portion of the tenant's data, for example.

The cloud platform 110A may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources.

In the case of a cloud platform being a so-called "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1B, the cloud platform 110A includes the service 112A, which is provided to for example the client 140A (or one of the other clients such as client 140B). This service 112A (including, e.g., application 112B and the like) may be deployed via a container, which provides a package or bundle of software, libraries, configuration data to enable the cloud platform to deploy during runtime the service 112A to, for example, one or more virtual machines that provide the service at the cloud platform. In the example of FIG. 1B, the service 112A is deployed during runtime, and provides at least one application such as an application provided as the service 112A (which is the runtime application providing the service at 112A and served to the client 140A). To illustrate further, the client 140A may access the application 112B provided via service 112A that executes at least one process, such as create a purchase order, perform a query of a database, query data stored in a database instance 114A, and/or other type of operation for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110A.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1B, the database 114A may be accessed as a service at a cloud platform, which may be the same or different platform from cloud platform 110A. In the case of REST compliant interfaces, the interface 112E may provide a uniform interface that decouples the client and server, is stateless (e.g., a request includes all information needed to process and respond to the request), cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1B, the database instances are deployed as a service, such as a DaaS, at the cloud platform 110A. Although the database instances are depicted at the same cloud platform 110A, one or more of the database instances may be hosted on another or separate platform (e.g., on-premise) and/or another cloud platform. Moreover, the service provided at the cloud platform may include other types of applications, such user interface applications, and the like.

As noted above, an end user may be accessing an application 112B and as part of the access (e.g., use) of the application, the application is not able to retrieve data from the database instance 114A to generate a report or perform some other type of action. In this example, from the perspective of the end user, the application is not available (although the unavailability is actually due to the database instance 114A.

The cloud platforms 110A-D may (as noted) be implemented using different technologies. As such, a system having heterogeneous cloud platforms may include for example, deployments at a SAP cloud, Microsoft Azure™, Amazon Web Services™, Google Cloud Platform™ data centers, a private data center, and/or the like. The heterogeneous cloud platform technology represents a multi-cloud system. In the case of database instances and/or their clients, some may be deployed at different private data centers (each of which may have different cloud platform technology, protocols, and the like), while some may be deployed at private data centers. Moreover, the databases instances at the cloud platform may rely on the same or different storage or database technology. For example, a database management system instance may be an online transaction processing (OLTP) system using a relational database system. An example of an OLTP system is the SAP S/4 HANA™ enterprise resource planning (ERP) system. Furthermore, the database management system instance may operate using for example the same or different storage technology, such as a row-oriented database system, a column-oriented database system, or a hybrid row-column store approach. Alternatively, or additionally, the database management system instance may be for example an online analytic processing (OLAP) system. Applications of OLAP systems include business reporting for sales, marketing, management reporting, business process management (BPM), budgeting, forecasting, financial reporting, and/or other types of analytics. An example of the OLAP system is the SAP BW/4 HANA™ data warehouse solution, which can be used to for example answer multi-dimensional analytical (MDA) queries.

Figure 4:
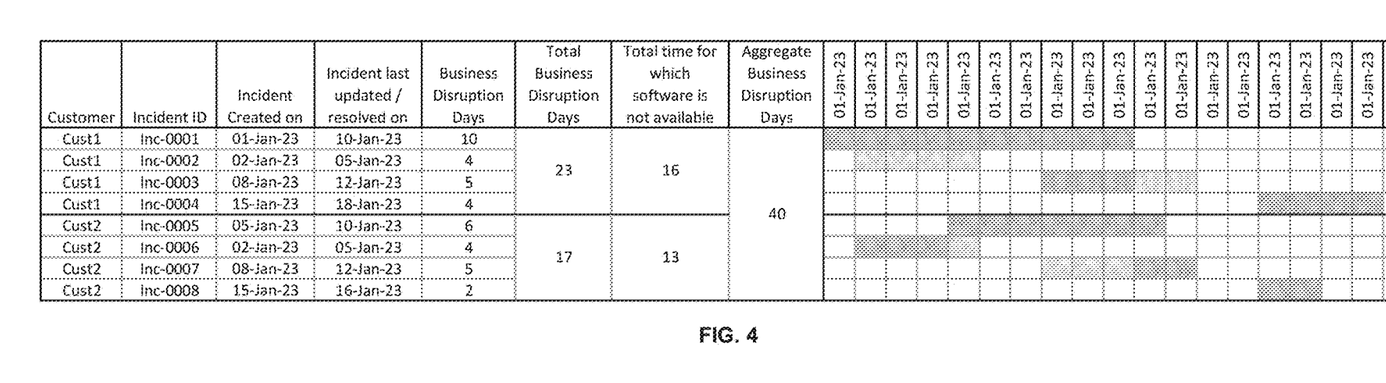
FIG. 4 depicts an example of a table showing downtimes, in accordance with some embodiments.

The downtime of the application 112B (which causes the end user disruption) may be measured based on the incident creation and resolution such as the time t 124 noted with respect to FIG. 1A. Although the disruption calculated with respect to t may provide an indication of the downtime of the application 112B, the downtime t may not represent the actual time for which the application is not available. FIG. 4 below provides an example.

Referring to FIG. 4, the first incident (Inc-0001, caused a disruption (t) of +124 equal to 10 days, the second incident (Inc-0002) caused a disruption of t 124 equal to 4 days, the third incident caused a disruption of t 124 equal to 5 days, and the fourth incident caused a disruption for t 124 equal to 4 days. If one were to sum the disruptions, the total days or disruption total is 23 days. However, some of these disruptions overlapped, so the actual total number of days the application is not available to the end user is 16 days (e.g., January 1-12 and January 15-18). FIG. 4 also shows that the disruptions can be sorted by end user (e.g., Customer 1 (Cust1), Customer 2 (Cust2), and so forth). Moreover, the disruptions may be aggregated across end users (e.g., the total disruption days 23 and 17 for Cust1 and Cust2 may be summed to provide aggregate end-used disruption days 40). In the example of FIG. 4, the aggregate of 40 days of downtime indicates that two end users accessing an application suffered a total of 40 days of downtime.

In some implementations, the application uptime system 199 takes into account the overlap in disruptions (e.g., overlapping times for a disruption), when determining the application's availability so the overlapping days are only counted once.

In some implementations, the application uptime system 199 determines metrics for the application that include an end user availability (e.g., uptime) metric, which may be the percentage of time the application was available for the end user. Referring to the example of FIG. 4, a first end user (Cust1) may have an availability for the month of January of 48.3% (1−(16 days 31 days)). The second end user (Cust2) may have an availability for the month of January of 58.0% (1-(13 days÷31 days)).

In some implementations, the application uptime system 199 determines a consolidated (also referred to as "aggregated") end user uptime metric that is determined across end users as an average of the end user uptime metrics. Referring to the previous example, the average of the end user uptime metrics is 53.2% (i.e., the average of 48.3% and 58%). The end user uptime metric may be defined in other ways as well. Table 1 illustrates another example of an uptime (i.e., availability) calculation for an application. Supposing a time period of 294 days for the end users for example, such as Cust1 and Cust2 of FIG. 4 with 16 days and 13 days of the application not being available, the end user uptime metric would be 95.06%. Table 1 below summarizes this example.

incident in terms of the number of end user systems that are impacted, the number of end user impacted, and/or a potential impact to the developer or solution provider (e.g., an issue/error reported by multiple customers and/or on multiple systems may have a greater impact when compared to an issue reported by only a single user/customer and/or system); a geographical region of the end user raising the incident (which may indicate an regional issue/problem); and/or a line of business and/or technical component of the incident for the developer/solution provider of the application (e.g., issue/problem raised from different processes but issue/problem related to the same technical issue, such as printing of a document). These and other metrics may be monitored, collected, and/or determined by the application uptime system 199, and then used to guide resolution of the errors in execution reported as incidents and/or may be used to generate user interface views including graphs (which may be comprised in a dashboard).

Figure 1C:
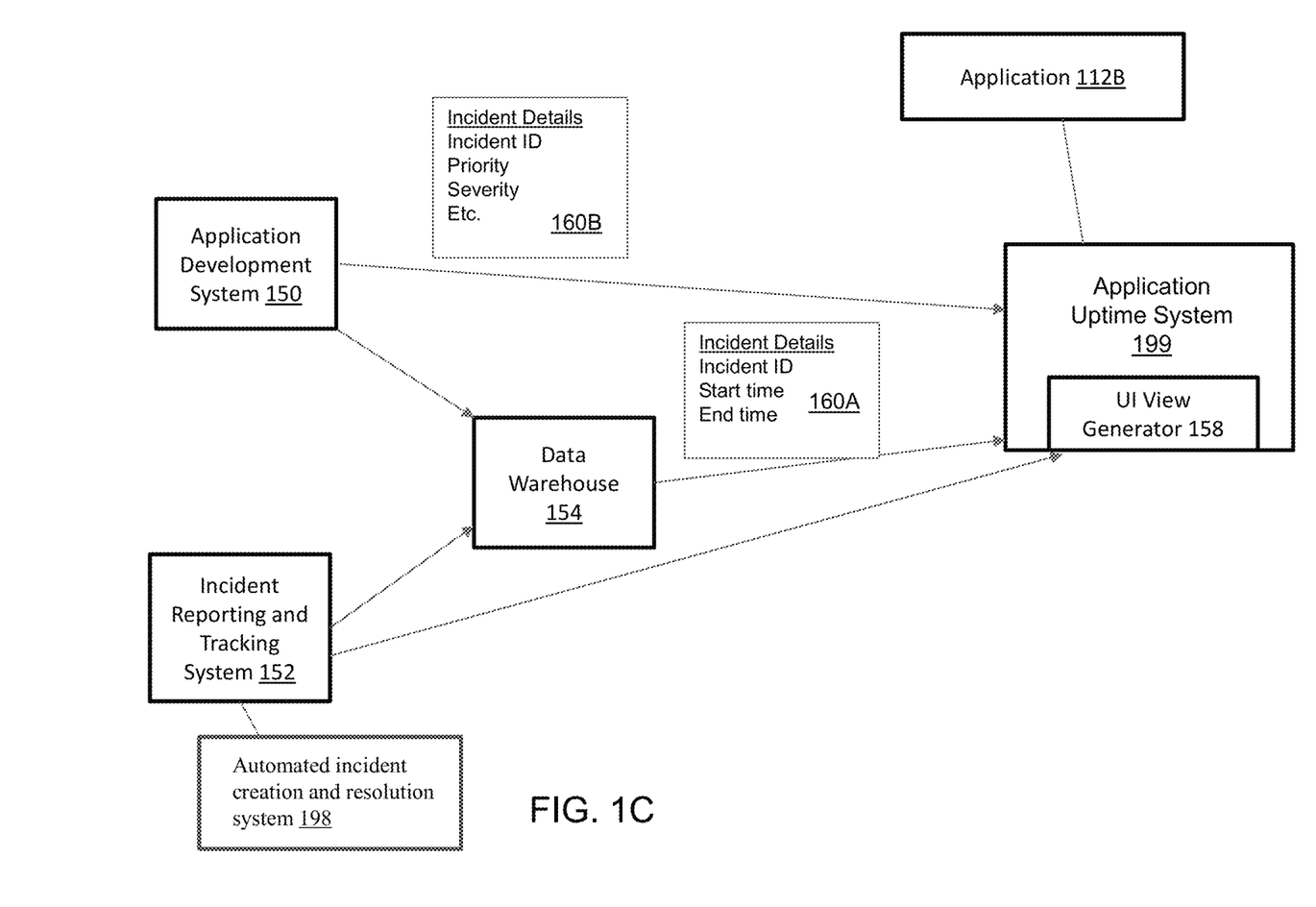
FIG. 1C depicts the application uptime system coupled to an application development system, an incident reporting and tracking system, and a data warehouse, in accordance with some implementations.

FIG. 1C depicts the application uptime system 199 coupled to an application development system 150, an incident reporting and tracking system 152, and a data warehouse 154, in accordance with some embodiments. In some implementations, the coupling provides enhanced application uptime metrics and enhanced details regarding an error in execution that can be used to more quickly resolve an error in execution of an application.

The application development system 150 provides an integrated development environment where one or more developers may develop, track, and work on fixes, updates, changes, and/or the like to software for one or more applications, such as application 112B. The application development system 150 may be hosted as for example a service at a cloud platform as shown at FIG. 1B.

The incident reporting and tracking system 152 is where one or more end users can report an incident regarding an issue (e.g., error) associated with an application being used by an end user. Alternatively, or additionally, the incident reporting and tracking system may include or be coupled to

TABLE 1

| | |
|---|---|
| Total ideal available time from Apr. 1, 2022 to Jan. 19, 2023 starting from | 294 Days for each customer |
| Total time for which software not available as of 19$^{th}$ Jan | 16 Days and 13 Days for Customer 1 & 2 respectively |
| Uptime % | Average of (% of (Total time available for a customer − Total time for which software is not available)/Total time available for the customer) = (((294-16)/294 + (294-13)/294) *100)/2 = 95.06% |

In some implementations, other metrics regarding the disruptions may be monitored, collected, and/or determined as well by the application uptime system 199. For example, while disruption days and end user uptime can be key performance indicators (KPIs) that can be considered for quantifying the end user's experience with an application, other metrics may be taken into account as they have an impact on end user uptime and the overall end user experience. To illustrate further, metrics regarding one or more of the following focus areas may also be collected by the application uptime system 199: a number of end users having an error in execution of an application; an identity of the most impacted customers (e.g., customer with a downtime that exceeds a threshold amount of time); a number of incidents (e.g., a quantity of the incidents reporting an error in the execution of the application); a criticality of the the automated incident creation and resolution system 198. The incident reporting and tracking system may be hosted as for example a service at a cloud platform as shown at FIG. 1B.

In some implementations, the incidents may be stored in the data warehouse 154, which may comprise a database management system (e.g., SAP S4/HANA or other type of database management system or store). The data warehouse may be hosted as for example a service at a cloud platform as shown at FIG. 1B (e.g., as a database instance).

In operation, when an incident (e.g., an error) occurs at an application being used by the end user as noted with the error in execution 110 of FIG. 1A, this triggers an incident (e.g., either automatically (e.g., yes at 112) via automated incident creation and resolution system 198 or manually (e.g., no at 112) via incident reporting and tracking system 152 with the user creating and sending the incident). The incident may be reported via the incident reporting and tracking system 152 (or the automated incident creation and resolution system 198) and stored in the data warehouse 154. For example, the incident may include a description of the error, an identifier for the error (e.g., unique identifier), an identity of the end user, an identity of the application, a version of the software of the application, a time of day, a date, and/or other information about the application, the error, and/or the system hosting the application, all of which may be stored at the data warehouse 154.

In the example of FIG. 1C, the application development system 150 may also access the incidents at the data warehouse 154 and provide additional information from the developer(s) (and/or the automated incident creation and resolution system 198) with respect to the incident and/or its resolution. For example, a developer accessing the application development system may view the incident information stored at the data warehouse 154 and determine a fix, such a resolution to the error in the form of an update to the application software, instructions for a fix, and/or the like.

Table 2 depicts an example of some of the information stored at the data warehouse 154 that is provided to developers and/or this is included (or associated with) the incident. The incident information may be pushed from the data warehouse 154 via a query or a share folder to the application uptime system 199 as shown by the incident report 160A. Likewise, the incident information may be pushed from the application development system 150 via an API to the application uptime system 199 as shown by the incident report 160B. The incident report 160A captures information provided via the end user, while the incident report 160B may capture additional information from developers trying to correct the error or issue that created the incident. As such, the incident report 160B may provide greater insight with respect to resolution of the error of the application. In some implementations, the incident reports 160A and 160B are linked (e.g., via an incident ID common to both reports 160A-160B), so that the information from the developers and end users can be mapped to each other for purposes of determining uptime, generating user interface (UI) views, and/or the like.

When the application uptime system 199 receives the incident information 160A-B provided by both paths, the uptime engine determines the metrics for the application(s), such as availability. Each release of an application may identify the version of the application (and/or, e.g., an ERP system and/or a cloud based ERP system where the application is executed).

TABLE 2

| Data Points | Description |
| --- | --- |
| Incident ID | Identifier of a the one or more issues raised by one or more end users. |
| Date Range | Dates on which the one or more issues were raised by an end user (e.g., during a release, update, etc.). |
| End user ID | An identifier of the end user (e.g., name, IP address, etc.) and/or organization associated with the end user. |
| Geographic Region | Region where the end user is located. |
| Line of Business | A functional or technical area of an end user (e.g., purchasing, human resources, etc.). |
| Incident Status | A current state or status of the incident (e.g., open, unresolved, resolved, and/or closed). |
| Issue Categories (Technical and Sub Technical) | A category associated with the issue. For example, issue categorization refers to a hierarchical categorization of one or more issues in terms of a technical reason. For example, a technical issue may be categorized as a usability issue, an application defect, a code error, and/or the like. |
| Incident Priority | Priority with respect to resolution (e.g., high, medium, low). An incident priority may be used to define a criticality of an incident. |
| Issue Resolution Status | How the incident has been resolved or being worked upon. It could be an interim state as well. Once an incident status has been resolved, the issue resolution status defines a type of issue resolution and its status, such as whether a hot fix is deployed, an emergency update or fix is in progress, a workaround is in progress, and/or the like. |
| Issue Impact | Probable impact of the issue on the application developer. For example, a very high priority incident may or may not result in additional losses. |
| Release | Release information for application being monitored. |
| Business Impact | Detailed description of the issue which captures how the business of the end user/customer is impacted. A customer impact may indicate an end user/customer's in ability to perform certain tasks, such as create month end billing for suppliers or generate delivery lists for the transporters. |

Figure 2A:
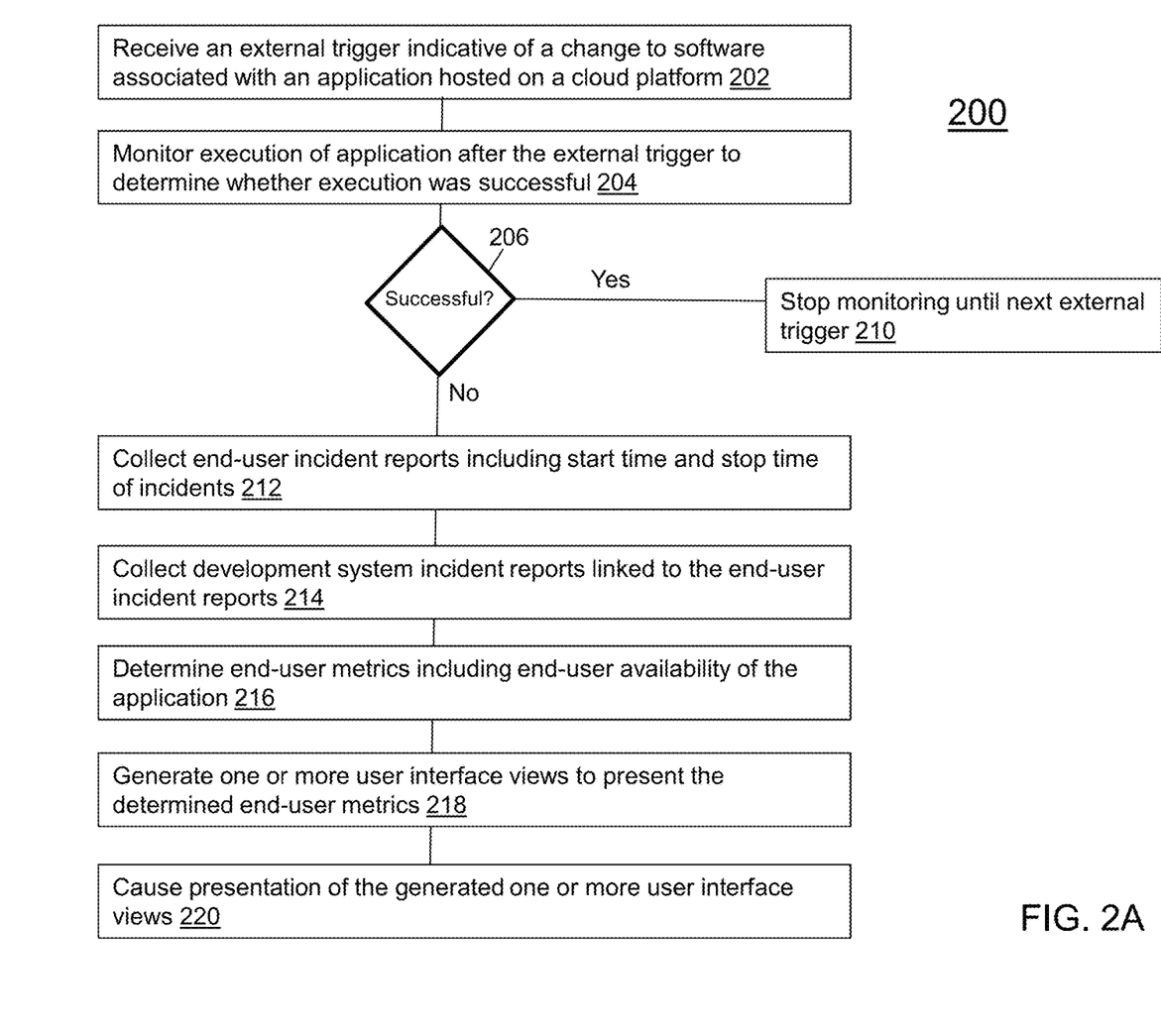
FIG. 2A depicts an example of a process, in accordance with some implementations.

FIG. 2A depicts an example of a process 200 for application uptime calculation, in accordance with some implementations.

At 202, an external trigger (which is indicative of a change to software associated with an application hosted on a cloud platform) may be received. For example, the application uptime system 199 may receive a message indicative of an external trigger, such as a software upgrade, patch, or some other type of fix or change to the application 112B as noted above with respect to 102 at FIG. 1A. The application uptime system 199 may receive the external trigger from the application development system 150 and/or the application 112B. In other words, the external trigger corresponds to a message or other indication of a change to the software of the application, such changes can include an update, upgrade, patch, fix, or some other type of change.

At 204, execution of the application (after the external trigger) may be monitored to determine whether execution was successful. In response to the event trigger for example, the application uptime system 199 may monitor the execution of the application 112B to see whether (or not) the application has any errors in execution and/or whether an error is reported via for example an incident. As noted above, the error in execution is from the perspective of the end user of the application, so the error may be indicated when an incident is reported for the application (e.g., reported to the data warehouse 154, incident reporting and tracking system 152, application uptime system 199, and/or other component). In some implementations, when there is an error in the execution of the application, an incident may be automatically created using an automated incident creation and resolution system that creates an incident and/or the end user may manually create an incident to document the error. As used herein, the application is considered to execute successfully without causing an incident, if no incidents for the application are reported either manually or via the automated incident creation and resolution system. By contrast, if incidents for the application are reported either manually or via the automated incident creation and resolution system the execution is considered unsuccessful.

If the execution of the application was successful (yes at 206), the monitoring of the application may stop, at 210, until another external trigger is received. For example, if the monitoring by the application uptime system 199 reveals the execution of the application 112B does not have any errors (e.g., no incidents are reported), the application uptime system 199 may stop monitoring of the application 112B until another external trigger is received as noted above at 202.

If the execution was not successful (no at 206), end user incident reports including start time and stop time of the incidents may be collected at 212. For example, the application uptime system 199 may collect from the data warehouse 154 end user incident reports. The collection may be a query of the incidents 160A for a given application, such as application 112B (which can be a push of the incidents 160A from the data warehouse to the application uptime system (e.g., via an API or a shared folder). The query may be based on incident ID or some other value.

Moreover, development system incident reports (which are linked to or associated with the end user incident reports) may be collected at 214. For example, the application uptime system 199 may collect from the data warehouse 154 development system incident reports 160B having additional details as noted above with respect to Table 2, for example. These development system incident reports 160B may be linked to (e.g., using a shared Incident ID) the end user incident reports 160A. The collection may be via a query of the incidents 160B for a given application, such as application 112B, a push of the incidents 160B from the data warehouse to the application uptime system (e.g., via an API or a shared folder).

At 216, end user metrics including end user availability of an application may be determined. For example, the application uptime system 199 may determine uptime based on the collected information at 212 and 214 as well as other metrics. To illustrate further, the application uptime system 199 may determine end user availability (e.g., uptime) metric, such as the percentage of time the application 112B for example was available for the end user. This availability may take into account the noted overlap in the downtimes reported by the end user and/or the overall time t 124 associated with an incident, so it reflects the downtime from an end user perspective. Moreover, the application uptime system 199 may determine a consolidated end user uptime metric, such as an average across end users uptime metrics and/or across applications.

At 218, one or more user interface views may be generated to present the determined end user metrics. For example, the application uptime system 199 (and/or the UI view generator 158) may generate a user interface (UI) view that includes the determined end user availability (e.g., uptime) metric(s), such as the percentage of time the application 112B was available for the end user, the average across end users uptime metrics, and/or other metrics. The UI views may take the form of a dashboard. Examples of the UI views are described below.

At 220, the generated one or more user interface views may be presented. For example, after the application uptime system 199 (and/or the UI view generator 158) generates user interface (UI) view, the generated view may be caused (e.g., sent, provided, and/or the like) to be presented on a display of a client, such as client 140A. As used herein, the phrase "causing to be presented" refers to sending and/or providing a user interface view to another device so that it can be presented on a display of the other device.

Figure 2B:
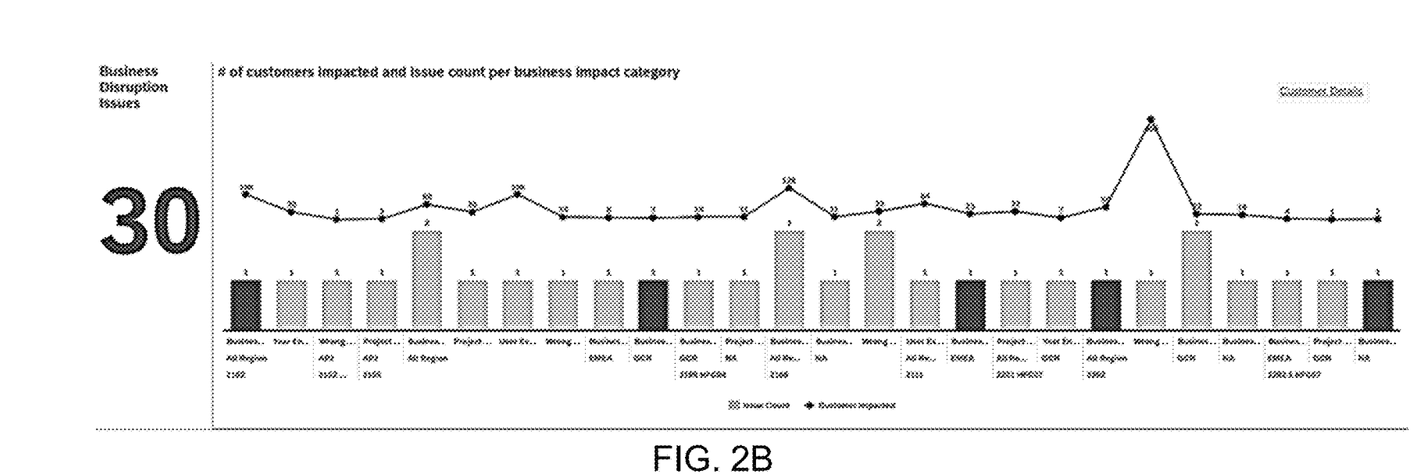
FIG. 2B, 2C, and 2D depict examples of user interface (UI) views generated by the application uptime system, in accordance with some implementations.

FIG. 2B depicts an example of a user interface (UI) view generated at 218 by the application uptime system 199 (and/or the UI view generator 158) and presented as a dashboard. In the example of FIG. 2B, the application uptime system 199 (and in particular the UI view generator) uses the metrics collected and determined for the application 112B and generates the UI view of FIG. 2B. Specifically, the UI view shows a total count of the issues (e.g., incidents reported) across customers (e.g., end users) which in this example is 30 and plots the issues across business impact category. For example, the category may represent the implication of the incident to the customer. This implication may, for example, relate to a possible impact or loss (e.g., resource loss, production loss, time loss, etc.) to the customer (also referred to as "customer impact"). Customer impact categories may include: resource loss, production loss, time loss, etc. to the customer.

Figure 2C:
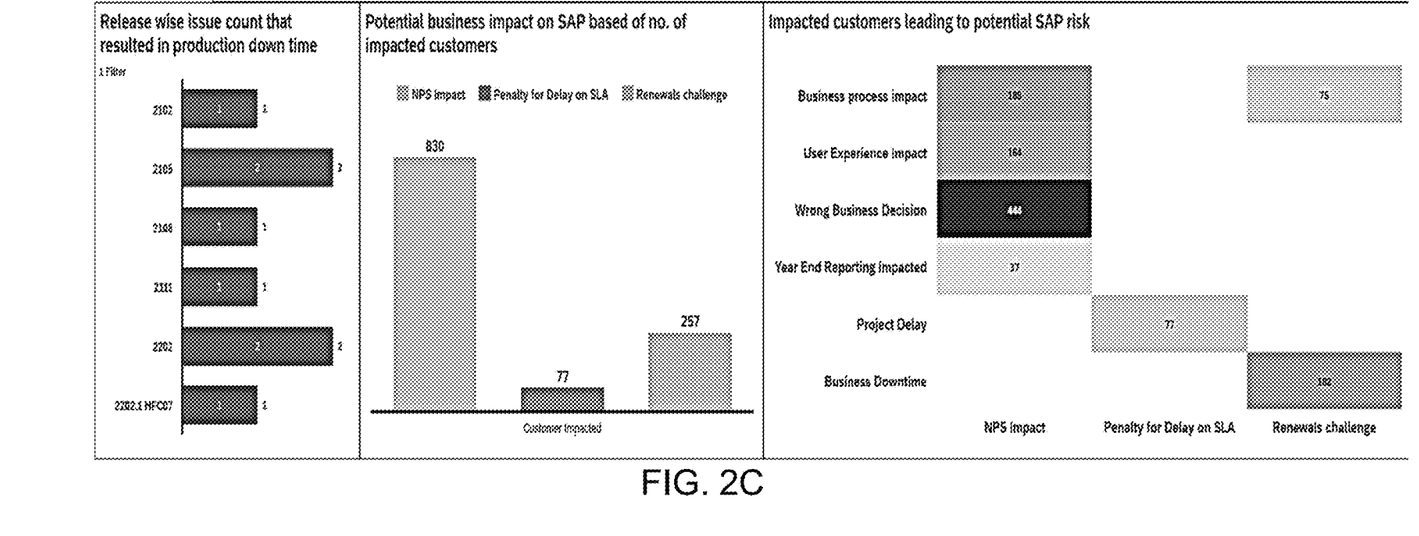

FIG. 2C depicts an example of a user interface (UI) view generated at 218 by the application uptime system 199 (and/or the UI view generator 158) and presented as a dashboard. In the example of FIG. 2C, the application uptime system 199 (and in particular the UI view generator) uses the metrics collected and determined for the application and generates the UI view. Specifically, the UI view of FIG. 2C shows a count of the issues (e.g., incidents reported for an execution error of an application) for each release (e.g., 2102, 2105, 2108, etc.) of the application, such as application 112B. The UI view of 2C also shows a potential impact based of a number of impacted customers (e.g., 77 which represents the quantity of end users affected by the downtime of the application). 830 and 257 represent the number of customers (e.g., customer count) for the "Issue Impact." This representation shows a number of customers under various impact categories, such as potential loss, renewal of software/application renewal, etc. The risk panel represents or provides one or more metrics indicative of a relationship of the business impact causing an impact to the developer of the application.

Figure 2D:
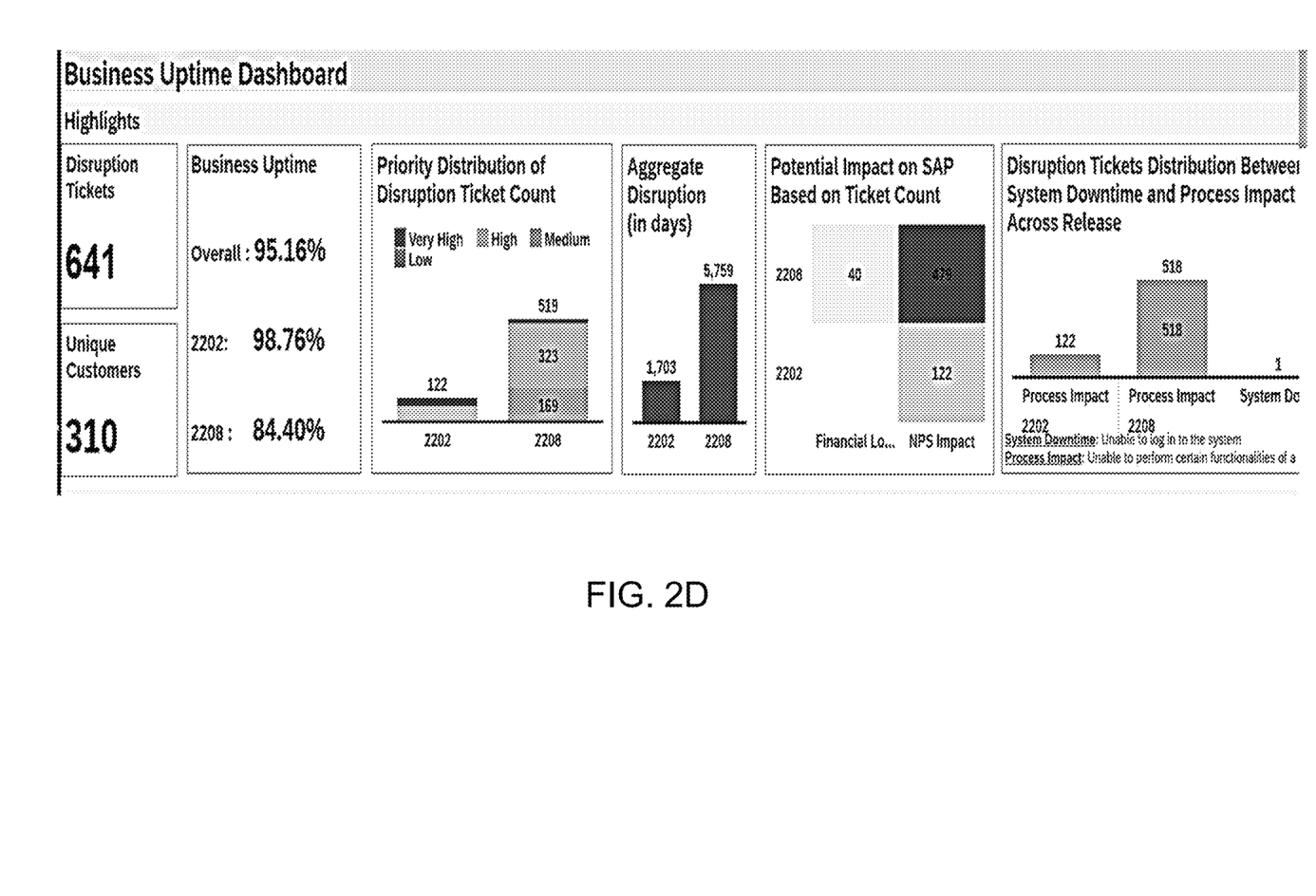

FIG. 2D depicts an example of a user interface (UI) view generated at 218 by the application uptime system 199 (and/or the UI view generator 158) and presented as a dashboard. In the example of FIG. 2C, the application uptime system 199 (and in particular the UI view generator) uses the metrics collected and determined for the application and generates the UI view. Specifically, the UI view of shows Disruption Tickets (which is a count of the total number of incidents reported across all end users), Unique Customers (which is a count of unique end users associated with incidents), Business Uptime (which indicates an overall availability of the application 112B across end users and the availability of each release (2202 and 2208) of application 112B is also presented, Priority Distribution of Disruption Ticket Count (which indicates a priority distribution of the raised incidents), Aggregate Disruption (which indicates total days of aggregate disruption across all customers) for each release, Potential Impact on SAP Based on Ticket Count (e.g., this refers to the number of incidents/tickets contributing to the impact on for example the application developer), and Disruption Tickets Distribution Between System Downtime and Process Impact Across Release. Each incident may be evaluated and the evaluation information may be stored with respect to any process or system impact due to the incident. This can help in categorization of the incidents that cause complete system down.

Figure 3:
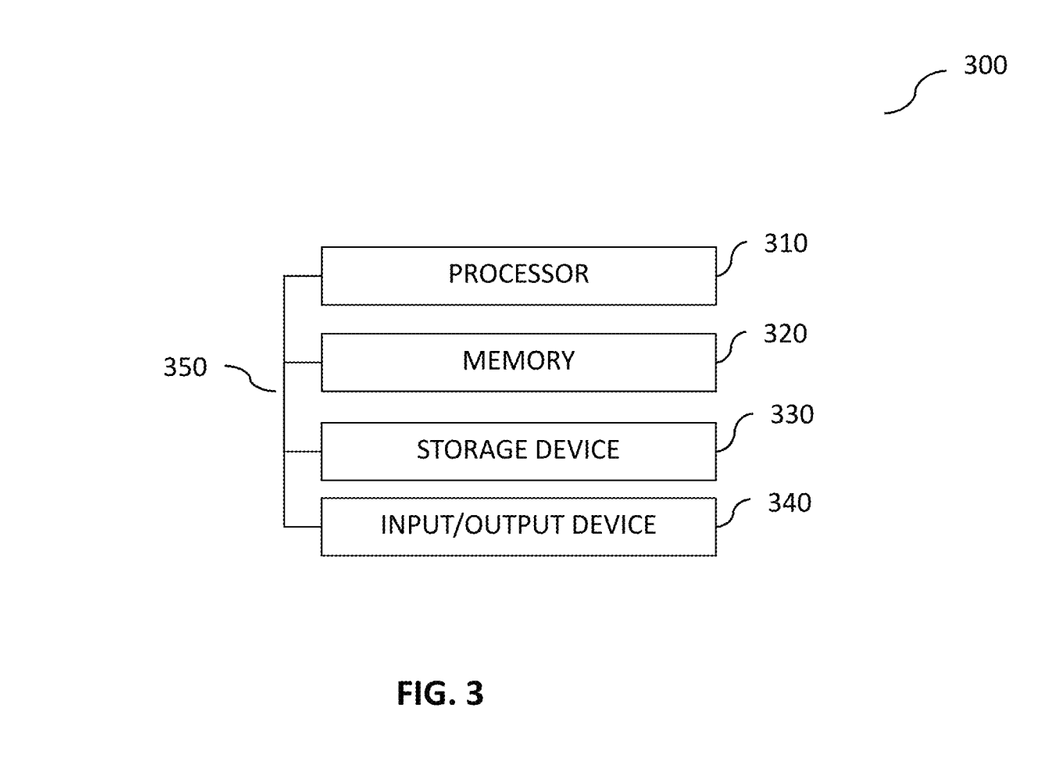
FIG. 3 depicts another example of a system, in accordance with some implementations.

In some implementations, the current subject matter may be configured to be implemented in a system 300, as shown in FIG. 3. For example, the application uptime system 199, automated incident creation and resolution system, application development system 150, incident reporting and tracking system 152, and/or other aspects disclosed herein may be at least in part physically comprised on system 300. Moreover, the system 300 may further provide an operating system, a hypervisor, and/or other resources, to provide virtualize physical resources (e.g., via virtual machines). The system 300 may include a processor 310, a memory 320, a storage device 330, and an input/output device 340. Each of the components 310, 320, 330 and 340 may be interconnected using a system bus 350. The processor 310 may be configured to process instructions for execution within the system 300. In some implementations, the processor 310 may be a single-threaded processor. In alternate implementations, the processor 310 may be a multi-threaded processor.

The processor 310 may be further configured to process instructions stored in the memory 320 or on the storage device 330, including receiving or sending information through the input/output device 340. The memory 320 may store information within the system 300. In some implementations, the memory 320 may be a computer-readable medium. In alternate implementations, the memory 320 may be a volatile memory unit. In yet some implementations, the memory 320 may be a non-volatile memory unit. The storage device 330 may be capable of providing mass storage for the system 300. In some implementations, the storage device 330 may be a computer-readable medium. In alternate implementations, the storage device 330 may be a floppy disk device, a hard disk device, an optical disk device, a tape device, non-volatile solid state memory, or any other type of storage device. The input/output device 340 may be configured to provide input/output operations for the system 300. In some implementations, the input/output device 340 may include a keyboard and/or pointing device. In alternate implementations, the input/output device 340 may include a display unit for displaying graphical user interfaces.

As noted, the disruption to a customer (e.g., an end user) may be any event that has impacted the customer, such that the customer cannot execute a seamless business process, and the incident has been created (e.g., the customer has created an incident and the developer has identified the issue(s) associated with the incident. The business disruption represents a total time taken from incident creation to resolve the incident, which can be quantified as follows:

Business Disruption=(Date of incident resolution−Date of Incident creation)+1; or Business Disruption=(Date of last update on incident−Date of Incident creation)+1.

The calculations view of these calculations can be consumed and used to provide a model on which user interfaces, such as dashboards are generated, wherein each model contains transactional data built by a combination of dimensions (e.g., master data) and measures (e.g., numerical fields that hold the transactional value). The calculation view that provides the disruption days for an incident may provide the details of the incidents (which are uploaded into the application uptime system 199) along with the disruption days for each incident calculated by the application uptime system 199. The application uptime system 199 may also performs certain other calculations, data massaging/processing, and data cleansing which is reflected in a calculation view for further consumption.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising:
  monitoring, by an application uptime system, whether execution of an application is successful without causing an incident;
  in response to the execution of the application being successful without causing the incident, stopping, by the application uptime system, monitoring of the application until an external trigger is received; and in response to the execution of the application being unsuccessful and causing the incident, the method further comprising:
    collecting, by the application uptime system, one or more end user incident reports including an incident identifier, a start time of the incident, and a stop time of the incident,
    collecting, by the application uptime system, one or more development system incident reports linked to the one or more end user incident reports,
    determining, by the application uptime system, at least one end user metric for the application,
    generating, by the application uptime system, one or more user interface views based on the at least one end user metric for the application, and causing to be presented the one or more user interface views.

Example 2: The computer-implemented method of Example 1 further comprising:
  receiving, by the application uptime system, a first external trigger that is indicative of a change to the application hosted on a cloud platform, wherein the change comprises a new software version for the application, a patch for the application, and/or a fix for the application.

Example 3: The computer-implemented method of any of Examples 1-2, wherein the monitoring is in response to the first external trigger being received by the application uptime system.

Example 4: The computer-implemented method of any of Examples 1-3, wherein a successful execution of the application is based in part on whether an incident is reported for the application.

Example 5: The computer-implemented method of any of Examples 1-4, wherein when the application does not cause the incident, the execution of the application is considered successful.

Example 6: The computer-implemented method of any of Examples 1-5, wherein when the application does cause the incident, the execution of the application is considered unsuccessful.

Example 7: The computer-implemented method of any of Examples 1-6, wherein the one or more end user incident reports are collected from a data warehouse coupled to the application uptime system.

Example 8: The computer-implemented method of any of Examples 1-8, wherein the one or more end user incident reports are collected using a query based on at least one incident identifier for at least one incident.

Example 9: The computer-implemented method of any of Examples 1-8, wherein the one or more development system incident reports are linked to the end user incident reports via the at least one incident identifier.

Example 10: The computer-implemented method of any of Examples 1-9, wherein the application uptime system determines the at least one end user metric comprising availability for the application based at least in part on a time associated with the incident being reported to the incident being resolved.

Example 11: A system comprising:
1. at least one processor; and
2. at least one memory including instructions which when executed by the at least one processor causes operations comprising:
monitoring, by an application uptime system, whether execution of an application is successful without causing an incident;
in response to the execution of the application being successful without causing the incident, stopping, by the application uptime system, monitoring of the application until an external trigger is received; and in response to the execution of the application being unsuccessful and causing the incident, the operation further comprising:
collecting, by the application uptime system, one or more end user incident reports including an incident identifier,
a start time of the incident, and a stop time of the incident,
collecting, by the application uptime system, one or more development system incident reports linked to the one or more end user incident reports, determining, by the application uptime system, at least one end user metric for the application, generating, by the application uptime system, one or more user interface views based on the at least one end user metric for the application, and causing to be presented the one or more user interface views.

Example 12: The system of Example 11 further comprising: receiving, by the application uptime system, a first external trigger that is indicative of a change to the application hosted on a cloud platform, wherein the change comprises a new software version for the application, a patch for the application, and/or a fix for the application.

Example 13: The system of any of Examples 11-12, wherein the monitoring is in response to the first external trigger being received by the application uptime system.

Example 14: The system of any of Examples 11-13, wherein a successful execution of the application is based in part on whether an incident is reported for the application.

Example 15: The system of any of Examples 11-14, wherein when the application does not cause the incident, the execution of the application is considered successful.

Example 16: The system of any of Examples 11-15, wherein when the application does cause the incident, the execution of the application is considered unsuccessful.

Example 17: The system of any of Examples 11-16, wherein the one or more end user incident reports are collected from a data warehouse coupled to the application uptime system.

Example 18: The system of any of Examples 11-17, wherein the one or more end user incident reports are collected using a query based on at least one incident identifier for at least one incident.

Example 19: The system of any of Examples 11-18, wherein the one or more development system incident reports are linked to the end user incident reports via the at least one incident identifier.

Example 20: A non-transitory computer-readable storage medium including instructions which when executed by at least one processor causes operations comprising:
monitoring, by an application uptime system, whether execution of an application is successful without causing an incident;
in response to the execution of the application being successful without causing the incident, stopping, by the application uptime system, monitoring of the application until an external trigger is received; and in response to the execution of the application being unsuccessful and causing the incident, the operation further comprising:
collecting, by the application uptime system, one or more end user incident reports including an incident identifier,
a start time of the incident, and a stop time of the incident,
collecting, by the application uptime system, one or more development system incident reports linked to the one or more end user incident reports,
determining, by the application uptime system, at least one end user metric for the application,
generating, by the application uptime system, one or more user interface views based on the at least one end user metric for the application, and
causing to be presented the one or more user interface.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   monitoring, by an application uptime system, whether execution of an application is successful without causing an incident;
   in response to the execution of the application being successful without causing the incident, stopping, by the application uptime system, monitoring of the application until an external trigger is received; and
   in response to the execution of the application being unsuccessful and causing the incident, the method further comprising:
      collecting, by the application uptime system, one or more end user incident reports including an incident identifier, a start time of the incident, and a stop time of the incident,
      collecting, by the application uptime system, one or more development system incident reports linked to the one or more end user incident reports,
      determining, by the application uptime system, at least one end user metric for the application,
      generating, by the application uptime system, one or more user interface views based on the at least one end user metric for the application, and
      causing to be presented the one or more user interface views.

2. The computer-implemented method of claim 1 further comprising:
   receiving, by the application uptime system, a first external trigger that is indicative of a change to the application hosted on a cloud platform, wherein the change comprises a new software version for the application, a patch for the application, and/or a fix for the application.

3. The computer-implemented method of claim 2, wherein the monitoring is in response to the first external trigger being received by the application uptime system.

4. The computer-implemented method of claim 1, wherein a successful execution of the application is based in part on whether an incident is reported for the application.

5. The computer-implemented method of claim 1, wherein when the application does not cause the incident, the execution of the application is considered successful.

6. The computer-implemented method of claim 1, wherein when the application does cause the incident, the execution of the application is considered unsuccessful.

7. The computer-implemented method of claim 1, wherein the one or more end user incident reports are collected from a data warehouse coupled to the application uptime system.

8. The computer-implemented method of claim 7, wherein the one or more end user incident reports are collected using a query based on at least one incident identifier for at least one incident.

9. The computer-implemented method of claim 8, wherein the one or more development system incident reports are linked to the end user incident reports via the at least one incident identifier.

10. The computer-implemented method of claim 1, wherein the application uptime system determines the at least one end user metric comprising availability for the application based at least in part on a time associated with the incident being reported to the incident being resolved.

11. A system comprising:
at least one processor; and
at least one memory including instructions which when executed by the at least one processor causes operations comprising:
monitoring, by an application uptime system, whether execution of an application is successful without causing an incident;
in response to the execution of the application being successful without causing the incident, stopping, by the application uptime system, monitoring of the application until an external trigger is received; and
in response to the execution of the application being unsuccessful and causing the incident, the operations further comprising:
collecting, by the application uptime system, one or more end user incident reports including an incident identifier, a start time of the incident, and a stop time of the incident,
collecting, by the application uptime system, one or more development system incident reports linked to the one or more end user incident reports,
determining, by the application uptime system, at least one end user metric for the application,
generating, by the application uptime system, one or more user interface views based on the at least one end user metric for the application, and
causing to be presented the one or more user interface views.

12. The system of claim 11 further comprising:
receiving, by the application uptime system, a first external trigger that is indicative of a change to the application hosted on a cloud platform, wherein the change comprises a new software version for the application, a patch for the application, and/or a fix for the application.

13. The system of claim 12, wherein the monitoring is in response to the first external trigger being received by the application uptime system.

14. The system of claim 11, wherein a successful execution of the application is based in part on whether an incident is reported for the application.

15. The system of claim 11, wherein when the application does not cause the incident, the execution of the application is considered successful.

16. The system of claim 11, wherein when the application does cause the incident, the execution of the application is considered unsuccessful.

17. The system of claim 11, wherein the one or more end user incident reports are collected from a data warehouse coupled to the application uptime system.

18. The system of claim 17, wherein the one or more end user incident reports are collected using a query based on at least one incident identifier for at least one incident.

19. The system of claim 18, wherein the one or more development system incident reports are linked to the end user incident reports via the at least one incident identifier.

20. A non-transitory computer-readable storage medium including instructions which when executed by at least one processor causes operations comprising:
monitoring, by an application uptime system, whether execution of an application is successful without causing an incident;
in response to the execution of the application being successful without causing the incident, stopping, by the application uptime system, monitoring of the application until an external trigger is received; and
in response to the execution of the application being unsuccessful and causing the incident, the operations further comprising:
collecting, by the application uptime system, one or more end user incident reports including an incident identifier, a start time of the incident, and a stop time of the incident,
collecting, by the application uptime system, one or more development system incident reports linked to the one or more end user incident reports,
determining, by the application uptime system, at least one end user metric for the application,
generating, by the application uptime system, one or more user interface views based on the at least one end user metric for the application, and
causing to be presented the one or more user interface views.

* * * * *